3,171,536
GROUPING CONVEYOR MECHANISM
Fred I. Johnson, 369 Montrose Ave., Elmhurst, Ill.
Filed Feb. 26, 1963, Ser. No. 261,132
7 Claims. (Cl. 198—177)

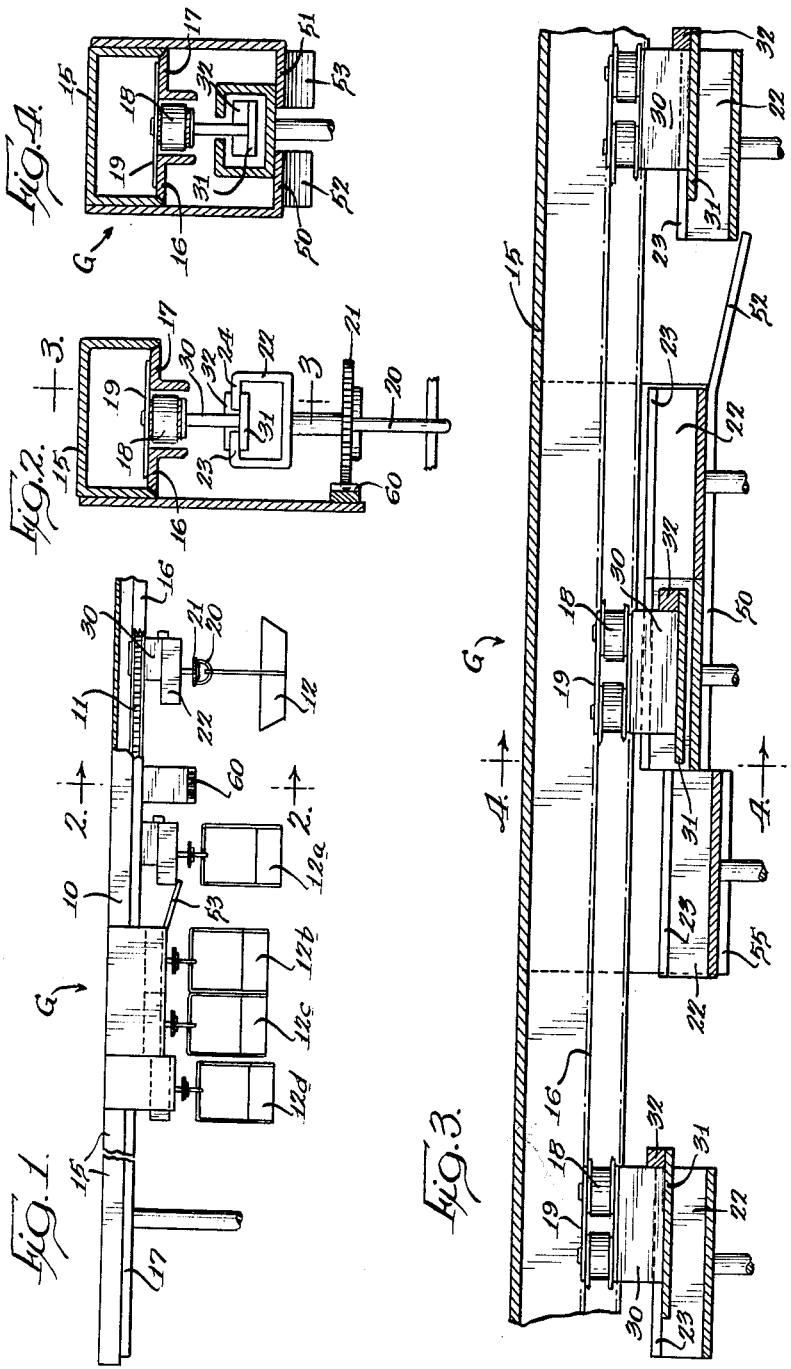

This invention relates to a conveyor mechanism and more particularly to a grouping conveyor mechanism.

An object of this invention is to provide a new and improved grouping conveyor mechanism.

Another object of this invention is to provide a grouping conveyor mechanism in which a work carrier is releasably connected to the conveyor by mechanism requiring no movable parts other than that obtained by relative movement between the work carrier and the conveyor.

Still another object of the invention is to provide a grouping conveyor mechanism having a conveyor in which a plurality of work carriers are associated therewith in spaced apart relation with the work carriers being held in driving relation with the conveyor by the weight of the work carriers and the support of the work carriers and drive connection thereto from the conveyor being released at a grouping station by movement of the work carrier toward the conveyor with this structure avoiding the need for pivoted dogs or other structures having complex movable parts and thus subject to wear and malfunctioning.

A further object of the invention is to provide a grouping conveyor mechanism as defined in the preceding paragraph in which the grouping station has a support device onto which a work carrier is moved with the device moving the carrier toward the conveyor to release the drive connection and an auxiliary device located at the exit end of the support device and at a lower level to hold a work carrier in position for re-engagement of the drive connection between the conveyor and carrier.

Further objects and advantages will become apparent from the following detailed description taken in connection with the accompanying drawings in which:

FIG. 1 is an elevational view of the grouping conveyor mechanism;

FIG. 2 is a vertical section on an enlarged scale taken generally along the line 2—2 in FIG. 1;

FIG. 3 is a fragmentary enlarged elevational view of the conveyor mechanism and showing the structure at the grouping station; and FIG. 4 is a vertical section taken along the line 4—4 in FIG. 3.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in FIG. 1, the grouping conveyor mechanism embodies a supporting framework 10 along which a conveyor 11, in the form of a travelling endless chain, moves with the chain being driven by suitable drive and sprocket mechanism (not shown). A series of work carriers 12 are supported by the conveyor 11, with the carrier 12 shown in a position prior to entry into a grouping station indicated generally at G. The work carrier 12a has been reoriented and is in position to enter the grouping station, with carriers 12b and 12c in storage at the grouping station and a carrier 12d positioned at a different level for re-engagement with the conveyor, as subsequently described.

The support frame 10 embodies a downwardly disposed member, such as channel iron 15, with a pair of angle irons 16 and 17 affixed thereto to provide a support for the conveyor chain in the form of a roller chain 18 having a load-supporting plate 19 travelling along the angle irons 16 and 17.

Each of the work carriers 12 includes a hanger 20 secured to a swivel device 21 rotatably secured to a yoke 22 constituting a box-like frame having horizontally disposed legs 23 and 24 at the upper side thereof which are spaced apart to define a slot therebetween extending the length of the yoke.

The work carrier is associated with the conveyor 11 by means of drive members, each including a plate 30 secured to and extending downwardly from the roller chain 18 with a transverse platform 31 at the lower end and an upstanding drive lug 32 at an end of the platform.

As shown in FIG. 2, the work carrier 12 has the frame legs 23 and 24 resting on the platform 31 due to the weight of the carrier, with the drive member plate 30 extending through the slot between the frame legs. In this condition, the drive lug 32, which is of a height slightly greater than the height of the frame legs 23 and 24, is at a level to engage behind these legs and move the work carrier with the conveyor. This is the normal condition, as shown with respect to work carrier 12 in FIG. 1.

In order to group a plurality of work carriers at the grouping station, the support device, shown in FIGS. 1, 3 and 4, is provided. This device embodies a pair of spaced-apart support members 50 and 51 supported from the conveyor frame 10, as shown in FIG. 4, with each of these members having an inclined entry end 52 and 53, respectively. These members are located at a distance from the conveyor 11 to move a work carrier toward the conveyor and raise the frame legs 23 and 24 off the drive member platform 31 and also raise these legs above the top of the drive lug 32, as shown in FIG. 3. When this relation exists, a work carrier 12 will not make connection with conveyor drive members, so that the conveyor can continue to travel while leaving a carrier in the grouping station. The members 50 and 51 are of a length which is a multiple of the carrier frame length and, as shown, this is two times the carrier frame length. A succeeding carrier moving into the grouping station will move the first carrier to the second position and a third carrier will move the first carrier off the members 50 and 51 onto an auxiliary support device having members similar to members 50 and 51 but at a slightly lower level, as shown in FIG. 3, with one of these members being indicated at 55. A carrier supported on the auxiliary support device is at a level to have the frame legs 23 and 24 at a level to be engaged by the drive lug 32 of the next approaching conveyor drive member unit. As a work carrier is carried off the auxiliary support device, the carrier moves down a slight further distance to have the carrier frame legs 23 and 24 again fully resting on the drive member platform 31.

In order to group a number of carriers in a minimum amount of space, the angular orientation of the carriers, but not their mounting frames, can be changed by positioning a rack 60 on the frame 10 ahead of the grouping station and this rack engages a star wheel 21 of a carrier to rotate the carrier 90°. A second unit after the grouping station can return the carriers back to their original orientation or provide any other orientation desired.

It will be seen from the foregoing that a grouping conveyor mechanism has been provided in which the work carriers are releasably associated with the conveyor by means of a releasable connection which can be released merely by a change in spacing therebetween and without requiring the use of any drive dogs or other movable parts.

I claim:

1. A grouping conveyor mechanism comprising, a conveyor, a plurality of work carriers associated with said conveyor in spaced apart relation, a grouping station for a plurality of carriers disposed along the path of said conveyor, a plurality of drive members secured to said conveyor and extending downwardly for association one with each of said carriers including a plate with an enlarged end and a drive lug, each of said carriers having a hollow frame with an elongate slot along the top thereof to receive said plate in said slot with the frame resting on said enlarged end positioned within the frame and the drive lug engaging the rear of said frame, and a support device at said grouping station onto which said carrier frames travel, said device being located at a distance from said conveyor to move a carrier toward the conveyor and elevate the frame whereby the drive lug is released from engagement with the frame and travels through the frame.

2. A grouping conveyor mechanism comprising, a conveyor, a plurality of work carriers associated with said conveyor in spaced apart relation, a grouping station for a plurality of carriers disposed along the path of said conveyor, a plurality of drive members secured to said chain and extending downwardly for association one with each of said carriers, a vertically releasable connection between each carrier and associated drive member, a support device at said grouping station onto which said carriers travel, said device being located at a distance from said conveyor to move a carrier toward the conveyor and elevate the carrier whereby the connection is released, and an auxiliary device positioned adjacent the exit end of said support device and at a lower level to support a carrier at a level for reestablishing the connection between the carrier and the conveyor.

3. A grouping conveyor mechanism comprising, a traveling endless chain conveyor, a plurality of work carriers associated with said conveyor in spaced apart relation, a grouping station for a plurality of carriers disposed along the path of said conveyor, a plurality of drive members secured to said chain and extending downwardly for association one with each of said carriers including a plate and a transverse platform with a drive lug extending upwardly from the platform, each of said carriers having a generally box-like frame with an elongate slot along the top thereof to receive said plate in said slot with the frame resting on said platform positioned within the frame and the drive lug engaging the rear of said frame, a support device at said grouping station onto which said carrier frames travel, said device being located at a distance from said chain to move a carrier toward the chain and elevate the box-like frame off the platform whereby the drive lug is released from engagement with the frame and travels through the frame, said device having a length which is a multiple of the length of said carrier frames whereby a frame is moved off said device by a later carrier entering said station, and an auxiliary device positioned adjacent the exit end of said support device and at a lower level to support a carrier at a level for engagement between the carrier frame and a chain drive lug.

4. A grouping conveyor mechanism comprising, a traveling conveyor, a plurality of work carriers associated with said conveyor in spaced apart relation, a grouping station for a plurality of carriers disposed along the path of said conveyor, a plurality of drive members secured to said conveyor and extending downwardly for association one with each of said carriers including a plate and a transverse platform with a drive lug extending upwardly from the platform, each of said carriers having a generally hollow frame with an elongate slot along the top thereof to receive said plate in said slot with the frame resting on said platform positioned within the frame and the drive lug engaging the rear of said frame, and means at said grouping station for releasing the drive lug from the carrier frame by relative movement of the carrier frame relative to said drive lug.

5. A grouping conveyor mechanism comprising, a conveyor, a plurality of work carriers associated with said conveyor in spaced apart relation, a grouping station for a plurality of carriers disposed along the path of said conveyor, a plurality of drive members secured to said conveyor and extending downwardly for association one with each of said carriers including a plate with an enlarged end and a drive lug, each of said carriers having a hollow frame with an elongate slot along the top thereof to receive said plate in said slot with the frame resting on said enlarged end positioned within the frame and the drive lug engaging said frame, and means at said grouping station for moving a carrier toward the conveyor to elevate the frame whereby the drive lug is released from engagement with the frame and travels through the frame.

6. A grouping conveyor mechanism comprising, a traveling endless chain conveyor, a plurality of work carriers associated with said conveyor in spaced apart relation, a grouping station for a plurality of carriers disposed along the path of said conveyor, means for interconnecting a carrier and the conveyor including a generally box-like frame with an elongate slot along the length thereof, a platform positioned within the frame, a drive lug on one of said frame and platform for drivingly connecting said frame and platform, said drive lug having a height less than that of the frame interior whereby relative movement between the frame and platform moves the drive lug to a non-driving position, said frame and platform being connected one to a carrier and the other to the conveyor with the platform being connected by a member extending through said slot, means at said grouping station to move a carrier toward the chain and effect said relative movement whereby the drive lug is released from engagement and to permit travel of succeeding drive lugs past said carrier.

7. A grouping conveyor mechanism comprising, a traveling conveyor, a plurality of work carriers associated with said conveyor in spaced apart relation, a grouping station for a plurality of carriers disposed along the path of said conveyor, a member with a transverse platform, a generally hollow frame with a central elongate slot along the length thereof to receive said member in said slot with the platform positioned within the frame, a drive lug movable with the conveyor for drivingly interconnecting the platform and the frame, one of said frame and platform being connected to the conveyor and the other to a carrier, and means at said grouping station for releasing the drive lug by elevation of the carrier relative to said conveyor to place the drive lug at an elevation which is clear of the carrier and the structure associated therewith.

References Cited in the file of this patent
UNITED STATES PATENTS
2,141,125    Braune _____ Dec. 20, 1938